United States Patent
Patel

(10) Patent No.: US 8,379,960 B2
(45) Date of Patent: Feb. 19, 2013

(54) SYSTEM AND METHOD FOR DISTINGUISHING BETWEEN BIOLOGICAL MATERIALS

(75) Inventor: Hima Patel, Gujarat (IN)

(73) Assignee: GE Healthcare Bio-Sciences Corp., Piscataway, NJ (US)

( * ) Notice: Subject to any disclaimer, the term of this patent is extended or adjusted under 35 U.S.C. 154(b) by 956 days.

(21) Appl. No.: 12/413,779

(22) Filed: Mar. 30, 2009

(65) Prior Publication Data

US 2010/0246926 A1 Sep. 30, 2010

(51) Int. Cl.
*G06K 9/00* (2006.01)
(52) U.S. Cl. .................. 382/133; 382/173; 382/180
(58) Field of Classification Search .......... 382/128, 382/133, 134, 173, 180, 203
See application file for complete search history.

(56) References Cited

U.S. PATENT DOCUMENTS

| 5,978,498 | A | 11/1999 | Wilhelm et al. |
| 6,330,350 | B1 | 12/2001 | Ahn et al. |
| 6,573,039 | B1 * | 6/2003 | Dunlay et al. ............ 435/4 |
| 2004/0086161 | A1 | 5/2004 | Sivaramakrishna et al. |
| 2005/0163373 | A1 | 7/2005 | Lee et al. |
| 2006/0014137 | A1 | 1/2006 | Ghosh et al. |

* cited by examiner

*Primary Examiner* — Phuoc Tran

(57) ABSTRACT

The invention provides a method for distinguishing biological materials. The method provides: providing at least one segmented image of at least two cells; applying a distance transform to the at least one segmented image of the confluent cells; applying a region growing technique to the distance transform of the at least one segmented image to form a region grown image, wherein a plurality of regions are formed in the at least one segmented image; assigning at least one label to at least one of the plurality of regions of the at least one segmented image of the confluent cells; applying a merging technique to at least two of the plurality of regions if it is determined that at least two of the plurality of regions are neighboring regions; determining whether to assign a same label to the neighboring regions or retain existing labels; and merging the neighboring regions of the region grown image if labels are changed to form at least one image of at least one cell.

12 Claims, 7 Drawing Sheets

SYSTEM AND METHOD FOR DISTINGUISHING BETWEEN BIOLOGICAL MATERIALS

FIELD OF THE INVENTION

The present invention relates to a system and method for distinguishing between confluent cells.

BACKGROUND OF THE INVENTION

Generally, the detailed mechanisms by which most genes, cells and viruses function in humans and other organisms are relatively unknown, despite the fact that there have been successful genomic sequencing programs and other extensive functional genomics efforts. Consequently, there is a need for screening approaches that enable high-throughput examination and elucidation of gene functions in a relevant physiological environment.

High-throughput, automated fluorescence microscopy makes it possible to screen and analyze the functions of hundreds of thousands of gene products in the context of the cell. Because microscopy has the potential to yield significantly more sub-cellular information than other detection methods, the term 'high content' has been adopted to describe screens and assays that are detected and quantified using automated imaging platforms. Both image acquisition and image analysis can be automated and then optimized to maximize throughput on high-content analysis systems. Two core components of the computational tools required for automated image analysis are the segmentation and positional tracking of individual cells.

Motility and division are two fundamental cell behaviors that are of great importance in a number of areas of research, including oncology, immunology, and developmental biology. While these behaviors have unique analysis requirements, they also share several significant analysis challenges. Examination of these behaviors requires time-lapse imaging. Implementation of time-lapse imaging for large-scale experimentation poses challenges with respect to finding assay, imaging, and analysis parameters that will be optimal across the wide variety of treatment conditions and behavioral phenotypes represented in a particular data set. Another challenge is that confluent cells/nuclei are commonly observed in microscopy images. During segmentation of these images, the confluent cells get correctly separated from the background as shown in FIG. 4A, but are not separated from each other, as shown in FIG. 4B. These clump of cells, which looks like a single unit can induce errors in measurements conducted on cells, like area, count of cells etc.

There is a need for a system and method that is able to separate confluent cells from each other so that there are no induced errors in measurements conducted on cells, like area, count of cells etc.

SUMMARY OF THE INVENTION

The present invention has been accomplished in view of the above-mentioned technical background, and it is an object of the present invention to provide a system and method for distinguishing biological materials.

In a preferred embodiment of the invention, a method for distinguishing biological materials is provided. The method provides: providing at least one segmented image of at least two cells; applying a distance transform to the at least one segmented image of the confluent cells; applying a region growing technique to the distance transform of the at least one segmented image to form a region grown image, wherein a plurality of regions are formed in the at least one segmented image; assigning at least one label to at least one of the plurality of regions of the at least one segmented image of the confluent cells; applying a merging technique to at least two of the plurality of regions if it is determined that at least two of the plurality of regions are neighboring regions; determining whether to assign a same label to the neighboring regions or retain existing labels; and merging the neighboring regions of the region grown image if labels are changed to form at least one image of at least one cell.

In another preferred embodiment of the invention, a system for distinguishing biological materials is disclosed. An imaging system configured to receive an image of at least one cell in a previous frame, wherein the imaging system is connected to an image receiving device. An image receiving device configured to: provide at least one segmented image of at least two confluent cells; apply a distance transform to the at least one segmented image; apply a region growing technique to the distance transform of the at least one segmented image to form a region grown image, wherein a plurality of regions are formed in the at least one segmented image; assign at least one label to at least one of the plurality of regions of the segmented image; apply a merging technique to at least two of the plurality of regions if it is determined that at least two of the plurality of regions are neighboring regions; determine whether to assign a same label to the neighboring regions or retain existing labels; and merge the neighboring regions if labels are changed of the region grown image into one image of at least one cell.

DETAILED DESCRIPTION OF THE INVENTION

The presently preferred embodiments of the invention are described with reference to the drawings, where like components are identified with the same numerals. The descriptions of the preferred embodiments are exemplary and are not intended to limit the scope of the invention.

Figure 1:
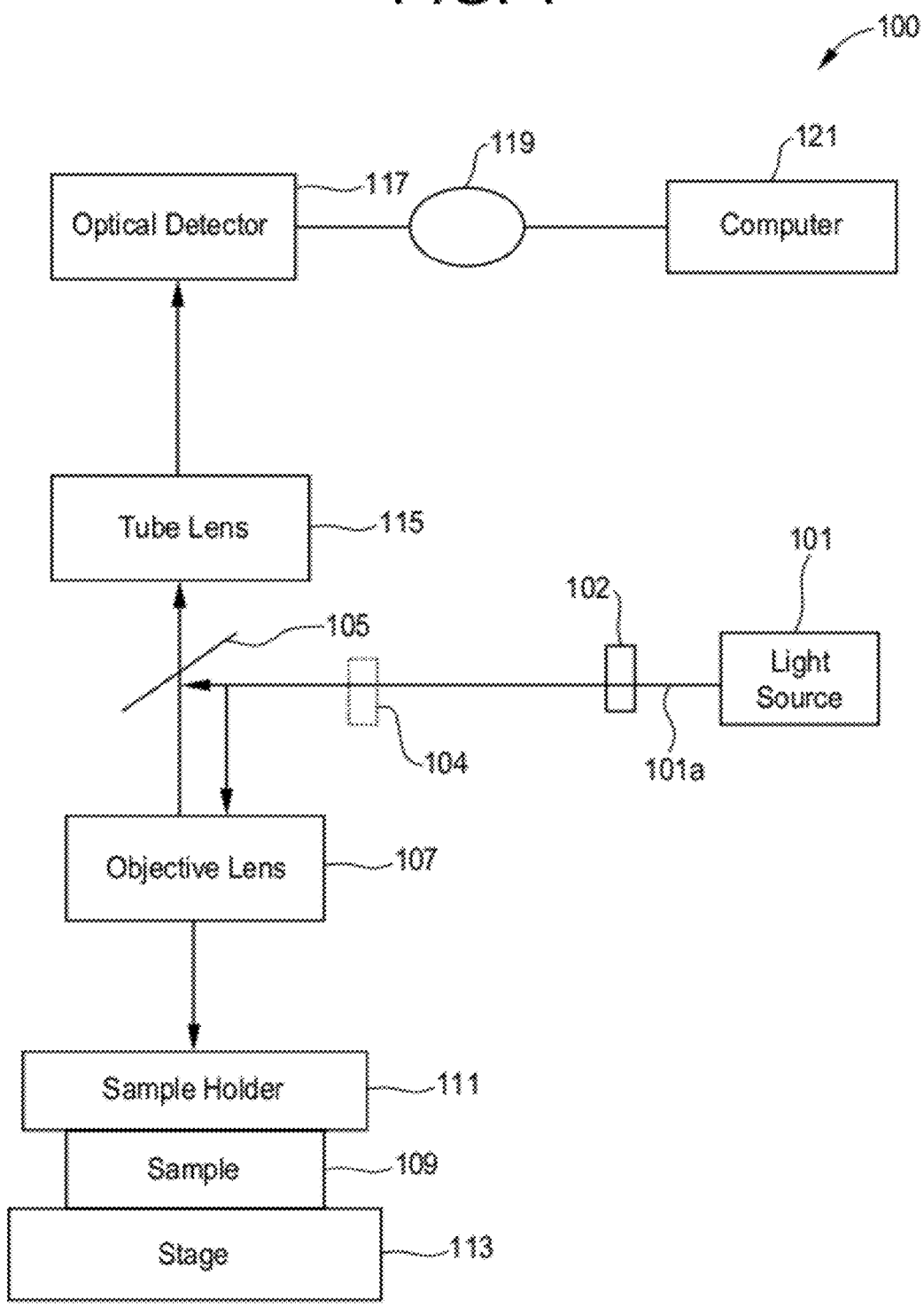
FIG. 1 is a block diagram of a typical imaging system in accordance with the invention.

FIG. 1 illustrates a block diagram of the essential components of a typical digital microscope system. This automated digital microscope system 100 includes the following components: a light source 101, a collimator 102, an optional aspherical optics 104 (in case of line scanning microscopy), beam folding optics 105, objective lens 107, a sample 109, a sample holder 111, a stage 113, a tube lens 115, an optical detector 117, an optional communication link 119 and an optional computer 121.

Light source 101 may be a lamp, a laser, a plurality of lasers, a light emitting diode (LED), a plurality of LEDs or any type of light source known to those of ordinary skill in the art that generates a light beam 101a. Light beam 101a is delivered by: the light source 101, collimator 102, optional aspherical optics 104, beam-folding optics 105 and objective lens 107 to illuminate sample 109. Sample 109 may be live biological materials/organisms, biological cells, non-biological samples, or the like. Aspherical optics 104 is a typical Powell lens. Beam-folding optics 105 is a typical scanning mirror or a dichroic mirror. The light emitted from the sample 109 is collected by objective lens 107, and then an image of the sample 109 is formed by the typical tube lens 115 on the optical detector 117. The optical detector 117 may be a charged coupled device (CCD), a complementary metal-oxide semiconductor (CMOS) image detector or any 2-D array optical detector utilized by those of ordinary skill in the art. Optical detector 117 is optionally, electrically or wirelessly, connected by the communications link 119 to the computer 121. In another embodiment, the optical detector 117 may be replaced with a typical microscope eyepiece or oculars that work with objective 107 to further magnify intermediate images so specimen details can be observed. Also, there may be two, three or more optical detectors 117 utilized in place of optical detector 117. Sample 109 is mounted on the sample holder 111, which may be referred to as a typical microtiter plate, a microscope slide, a chip, plate of glass, Petri dish, or any type of sample holder.

In another embodiment, the microscope system 100 optionally, may be electrically or wirelessly connected by a communication link 119 to the conventional computer 121. The communication link 119 may be any network that is able to facilitate the transfer of data between the automated microscope system 100 and the computer 121, such as a local access network (LAN), a wireless local network, a wide area network (WAN), a universal service bus (USB), an Ethernet link, fiber-optic or the like.

The microscope system 100 may be referred to as an image transmitting device, imaging device or imaging system that is capable of capturing an image, by utilizing the optical detector 117 or a typical microscope eyepiece, of the sample 109 or any type of object that is placed on the object stage 113. Also, the microscope system 100 may also be, for example, the INCELL ANALYZER™ 1000 or 3000 manufactured by GE Healthcare located in Piscataway, N.J. Microscope system 100 may be a typical confocal microscope, fluorescent microscope, epi-fluorescent microscope, phase contrast microscope, differential interference contrast microscope, or any type of microscope known to those of ordinary skill in the art. In another embodiment, the microscope system 100 may be a typical high throughput and high content sub cellular imaging analysis device that is able to rapidly detect, analyze and provide images of biological organisms or the like. Also, the microscope system 100 may be an automated cellular and sub-cellular imaging system.

The optical detector 117 that receives the reflected or fluorescent light from the sample may be a photomultiplier tube, a charged coupled device (CCD), a complementary metal-oxide semiconductor (CMOS) image detector or any optical detector utilized by those of ordinary skill in the art. Optical detector 117 is electrically or wirelessly connected by the communication link 119 to the computer 103. In another embodiment, the optical detector 117 may be replaced with the typical microscope eyepiece or oculars that work with objective lens 107 to further magnify intermediate image so that specimen details can be observed.

The computer 121 may be referred to as an image receiving device 121 or image detection device 121. In another embodiment of the invention, image receiving device 121 may be located inside of the image transmitting device 100. The image receiving device 121 acts as a typical computer, which is capable of receiving an image of the sample 115 from the optical detector 107, then the image receiving device 103 is able to display, save or process the image by utilizing a standard image processing software program, algorithm or equation. Also, the computer 121 may be a personal digital assistant (PDA), laptop computer, notebook computer, mobile telephone, hard-drive based device or any device that can receive, send and store information through the communication link 119. Although, one computer 121 is utilized in this invention a plurality of computers may be utilized in place of computer 121.

Figure 2:
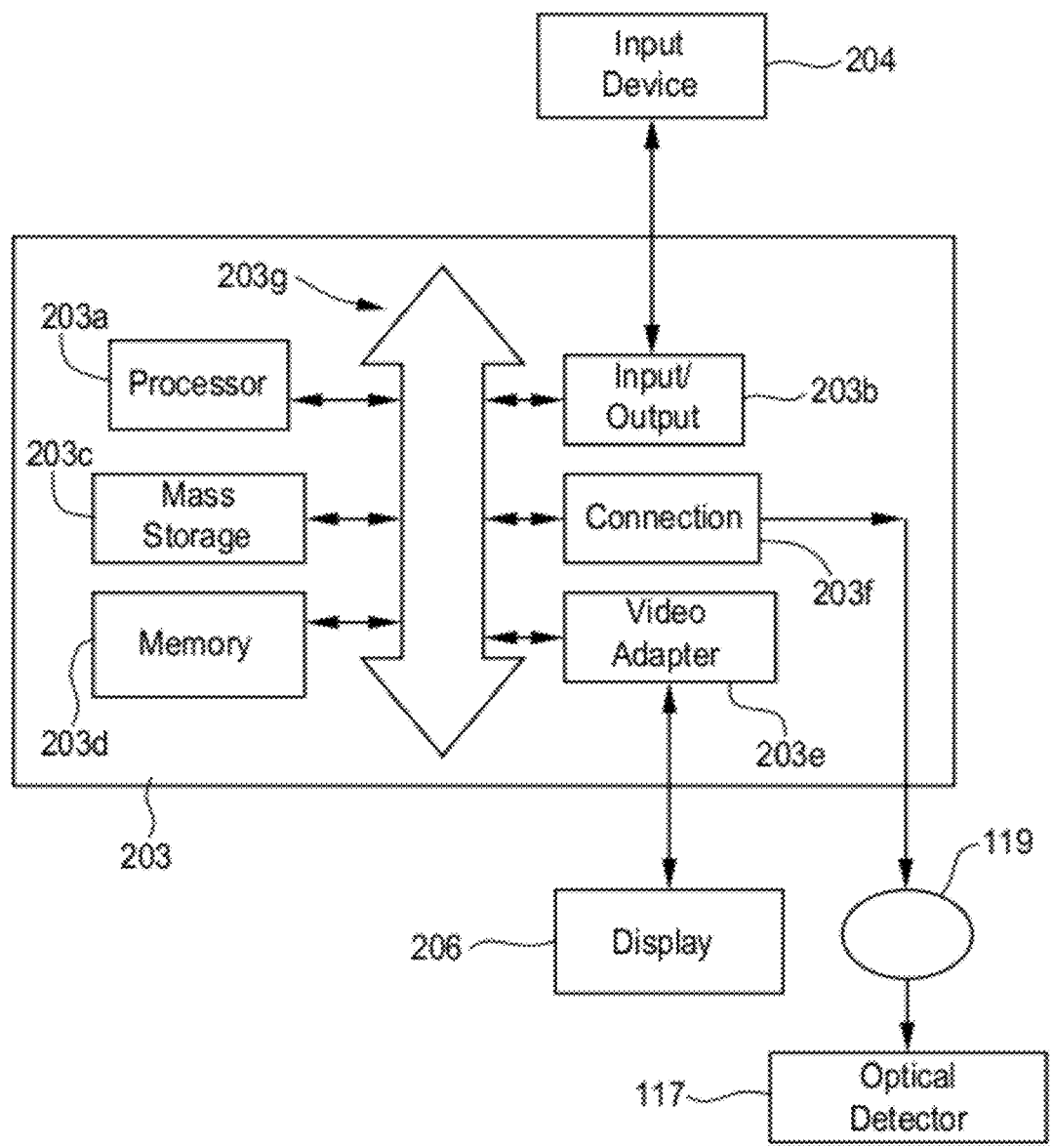
FIG. 2 is a schematic of an image-receiving device of FIG. 1 in accordance with the invention.

FIG. 2 illustrates a schematic diagram of the image-receiving device of the watershed declumping algorithm system of FIG. 1. Image or imaging receiving device 121 or image receiving device 203 includes the typical components associated with a conventional computer. Image receiving device 203 may also be stored on the image transmitting system 100. The image receiving device 203 includes: a processor 203a, an input/output (I/O) controller 203b, a mass storage 203c, a memory 203d, a video adapter 203e, a connection interface 203f and a system bus 203g that operatively, electrically or wirelessly, couples the aforementioned systems components to the processor 203a. Also, the system bus 203g, electrically or wirelessly, operatively couples typical computer system components to the processor 203a. The processor 203a may be referred to as a processing unit, a central processing unit (CPU), a plurality of processing units or a parallel processing unit. System bus 203g may be a typical bus associated with a conventional computer. Memory 203d includes a read only memory (ROM) and a random access memory (RAM). ROM includes a typical input/output system including basic routines, which assists in transferring information between components of the computer during start-up.

Figure 3:
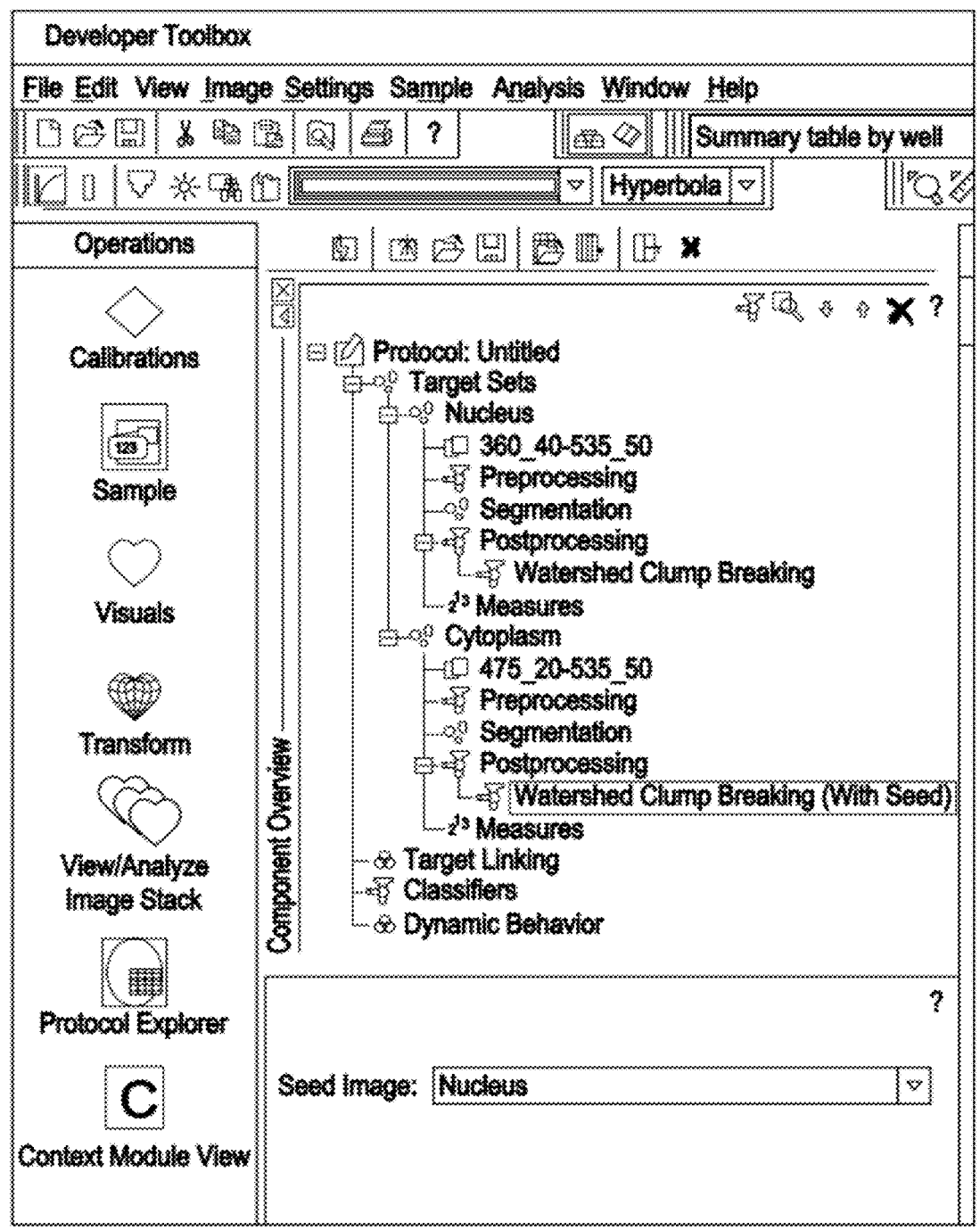
FIG. 3 is a graphical user interface of a watershed-declumping algorithm in accordance with the invention.

Input/output controller 203b is connected to the processor 203a by the bus 203g, where the input/output controller 203b acts as an interface that allows a user to enter commands and information into the computer through the watershed declumping algorithm graphical user interface (GUI) shown in FIG. 3 and input device 204, such as a keyboard and pointing devices. The typical pointing devices utilized are joysticks, mouse, game pads or the like. A display 206 is electrically or wirelessly connected to the system bus 203g by the video adapter 203e. Display 206 may be the typical computer monitor, plasma television, liquid crystal display (LCD) or any device capable of displaying characters and/or still images generated by a computer 203. Next to the video adapter 203e of the computer 203, is the connection interface 203f. The connection interface 203f may be referred to as a network interface, which is connected, as described above, by the communication link 119 to the optical detector 117. Also, the image-receiving device 203 may include a network adapter or a modem, which enables the image receiving device 203 to be coupled to other computers.

Above the memory 203d is the mass storage 203c, which includes: 1. a hard disk drive component (not shown) for reading from and writing to a hard disk and a hard disk drive interface (not shown), 2. a magnetic disk drive (not shown) and a hard disk drive interface (not shown) and 3. an optical disk drive (not shown) for reading from or writing to a removable optical disk such as a CD-ROM or other optical media and an optical disk drive interface (not shown). The aforementioned drives and their associated computer readable media provide non-volatile storage of computer-readable instructions, data structures, program modules and other data for the computer 103. Also, the aforementioned drives include the technical effect of having an algorithm for distinguishing and merging confluent cells, software or equation of this invention, which will be described in the flow chart of FIG. 5.

The software has a distinguishing cells or clump breaking graphical user interface (GUI) shown in FIG. 3. The distinguishing clump breaking graphical user interface is a specially programmed GUI that has some of the same functionality as a typical GUI, which is a software program designed to allow a computer user to interact easily with the computer 203. The distinguishing clump breaking GUI includes a screenshot that displays: 1. a merging method as discussed in FIG. 5.

Figure 4A:
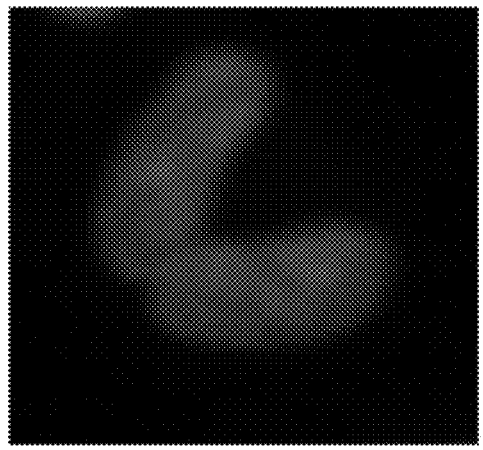
FIG. 4A and FIG. 4B are graphic illustrations of a raw image having confluent cells and a segmented output in accordance with the invention.
Figure 4B:
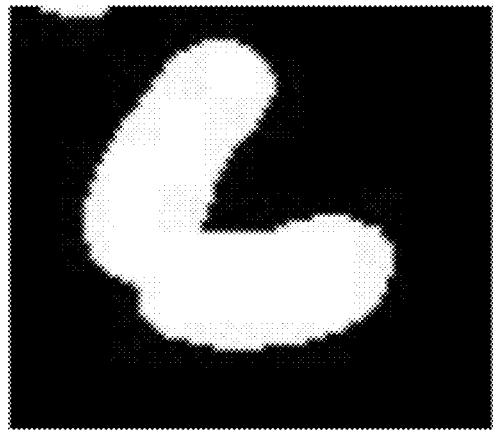

FIG. 4A and FIG. 4B are graphical illustrations of a typical raw image having confluent cells and a segmented output. Confluent cells/nuclei are commonly observed in microscopy images as shown in FIG. 4A. During segmentation of these images, the confluent cells are separated from the background of the raw images, but are not separated from each other as shown in FIG. 4B. These clumps of cells that look like a single unit can induce errors in measurements conducted on cells, like area, count of cells etc.

Figure 5:
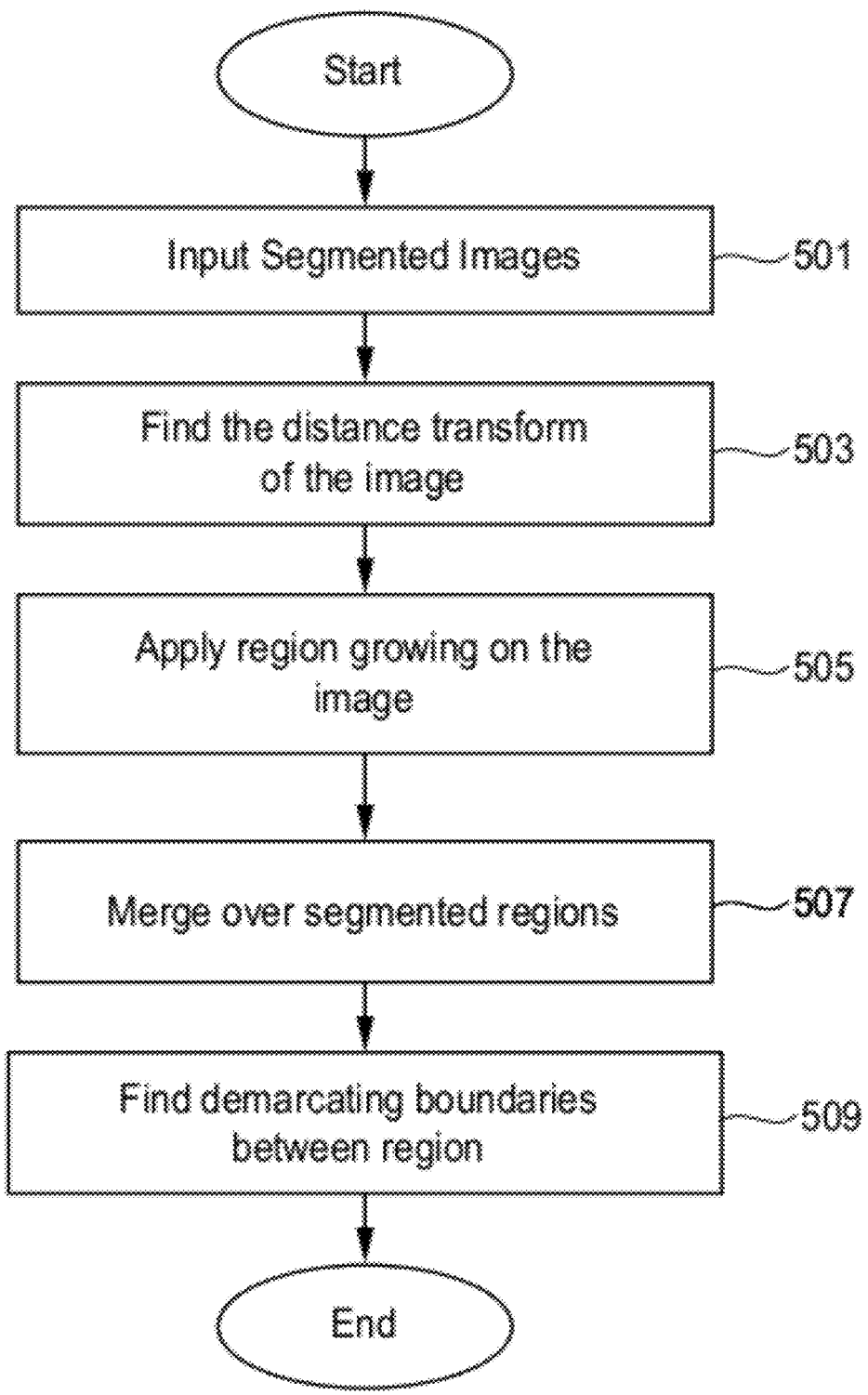
FIG. 5 is a flow chart that depicts how the watershed de-clumping algorithm operates in accordance with the invention.

FIG. 5 depicts a flow chart of how the watershed de-clumping algorithm is utilized. This description is in reference to an image with two clumped cells, but this description also applies to a plurality of images of two or more cell or a number of cells being detected by the microscope system 100. A user inserts the biological sample (e.g. cell or plurality of cells) into the microscope system 100, where an image of the sample is transferred by the optical detector 107 through the communication link 119 to the connection interface 203$f$ (FIG. 2) where an image of the biological sample or cell is received at the image receiving device 121 at block 501. This image may be that of confluent cells/nuclei that is commonly observed in microscopy images as described above for FIG. 4A and FIG. 4B. Confluent cells are high-densely populated cells that are in close proximity to each other sometimes with indistinguishable intercellular properties. Clumped cells are cells with indistinguishable properties. At block 503, the user utilizes the input device 204 to access the watershed de-clumping algorithm graphical user interface (GUI) to apply the watershed-declumping algorithm to the inserted image or the segmented image of the confluent cells/nuclei. The phrase confluent cells are and equivalent to the phrase clumped cells. When the watershed declumping algorithm is applied to the inserted segmented image of the confluent cells/nuclei, a typical distance transform is also applied to the segmented image of the at least one confluent cell or clumped cell. The distance transform is represented as distance of every pixel of the segmented image of the at least one confluent cell to the nearest background pixel. Thus, an intensity value of every pixel of the inserted segmented image of the confluent cell, after applying distance transform, is directly proportional to a shape of the object the pixel belongs to. The distance transform formula or algorithm is from the Intel Open CV library for DistTransform 10-34, page 196. *OPEN CV REFERENCE MANUAL, Intel*, copyright 2001 located at the INTEL® Developer Center website.

Figure 5A:
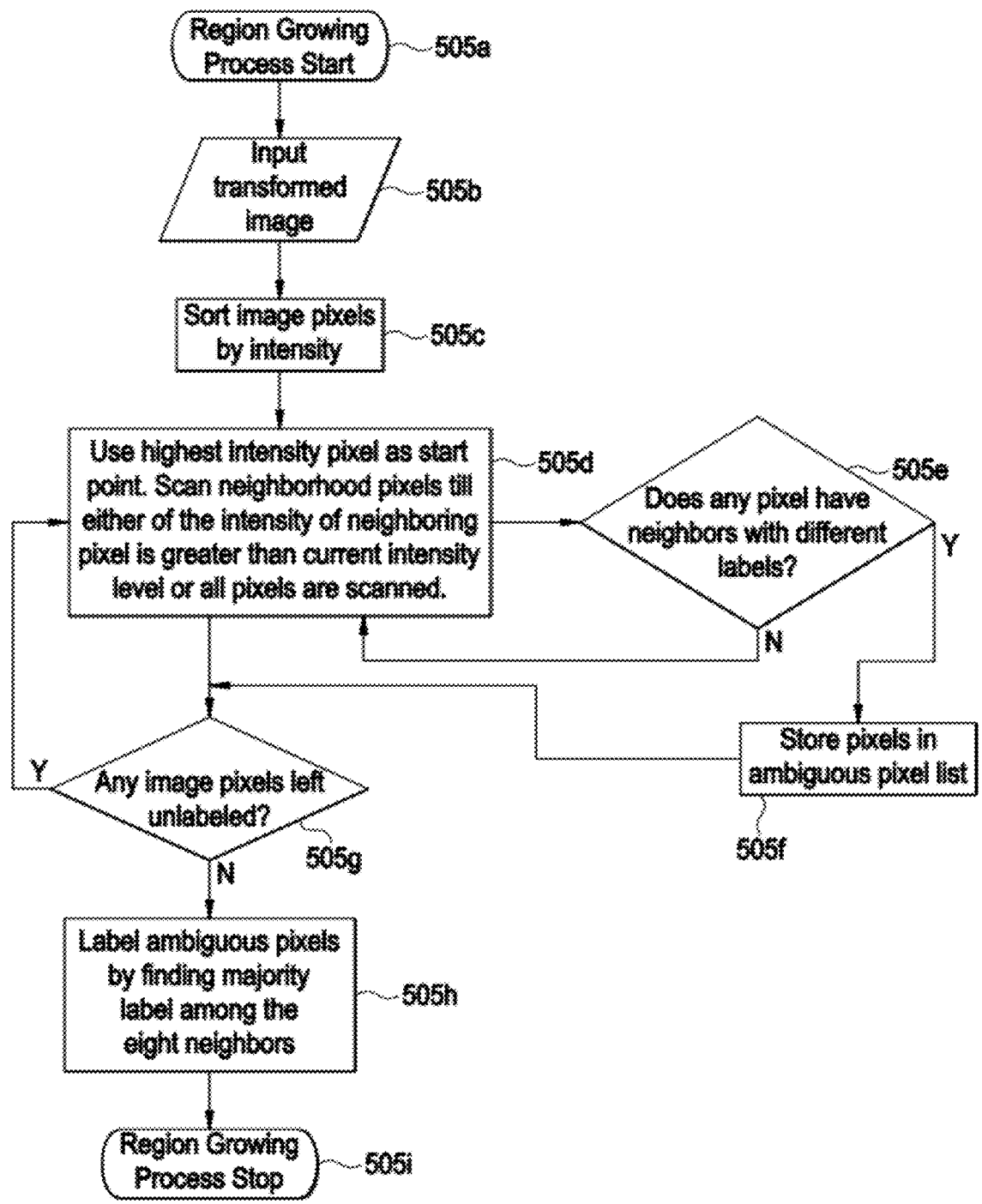
FIG. 5A is a flow chart that depicts how the region growing technique operates in accordance with the invention.

At block 505, a region growing technique is applied to the distance transformed image. The technique for region growing is such that generally more than one region is grown per cell so a plurality of regions are formed in the transformed image or segmented transformed image of at least two confluent cell/nuclei. The incentive behind this is to have at least one region per cell. The region growing technique flow-chart is disclosed in FIG. 5A. At block 505$a$, the region growing process is started. At block 505$b$, the transformed images are inputted into the system. Next, at block 505$c$ the images are sorted by an intensity level, such as the images are sorted by intensity in descending order i.e. pixel with highest intensity is at the top.

At block 505$d$, the highest intensity pixel is utilized as a starting point in order to scan neighborhood pixels until either the intensity of the neighboring pixels is greater than current intensity or all pixels are scanned. Next, at block 505$e$ there is a determination if any pixel has neighbors with different labels. If it is determined that the pixels do not have neighbors with different labels then the process returns to block 505$d$. However, if the pixels have neighbors with different labels then the pixels are stored in an ambiguous pixel list at block 505$f$.

Next, at block 505$g$ there is a determination if any image pixel left are unlabelled. If there are any images that are unlabelled, then the process returns to block 505$d$. However, if there are no images that are unlabelled, then the process goes to block 505$h$. At block 505$h$, ambiguous pixels are labeled by finding majority label among the eight neighbors. Next, at block 505$i$ the region growing process stops and returns to block 507 of FIG. 5. Region growing is applied to entire distance transformed image. During the region growing technique, labels are assigned to each region of the transformed image. The pixels, which lie at intersecting boundary between two regions, for example region 1 and 2, are termed as "ambiguous" pixels. The reason for this is that there is ambiguity whether they should be assigned label from region 1 or region 2.

At block 507, a decision-making logic algorithm is utilized to assign labels to ambiguous pixels This decision-making logic algorithm checks for all eight neighboring pixels in the transformed image and finds the maximum label among all eight. This label is assigned to the ambiguous pixel. This technique helps maintain the correct shape of the regions. This is shown diagrammatically below. Table 1 shows a hypothetical case of two neighboring regions with labels 1 and 2. The numeral 'A' denotes an ambiguous pixel. Table 2 is a hypothetical case showing the effect of incorrect assignment of label to an ambiguous pixel. Table 3 shows correct assignment of labels to ambiguous pixels, thereby retaining the shape of the region.

TABLE 1

| 1 | 1 | 1 | 1 | 2 | 2 | 2 |
|---|---|---|---|---|---|---|
| 1 | 1 | 1 | A | 2 | 2 | 2 |
| 1 | 1 | 1 | A | 2 | 2 | 2 |
| 1 | 1 | 1 | 1 | 2 | 2 | 2 |
| 1 | 1 | 1 | 1 | 2 | 2 | 2 |

TABLE 2

| 1 | 1 | 1 | 1 | 2 | 2 | 2 |
|---|---|---|---|---|---|---|
| 1 | 1 | 1 | 2 | 2 | 2 | 2 |
| 1 | 1 | 1 | 1 | 2 | 2 | 2 |
| 1 | 1 | 1 | 1 | 2 | 2 | 2 |
| 1 | 1 | 1 | 1 | 2 | 2 | 2 |

TABLE 3

| | | | | | | |
|---|---|---|---|---|---|---|
| 1 | 1 | 1 | 1 | 2 | 2 | 2 |
| 1 | 1 | 1 | 1 | 2 | 2 | 2 |
| 1 | 1 | 1 | 1 | 2 | 2 | 2 |
| 1 | 1 | 1 | 1 | 2 | 2 | 2 |
| 1 | 1 | 1 | 1 | 2 | 2 | 2 |

Figure 6:
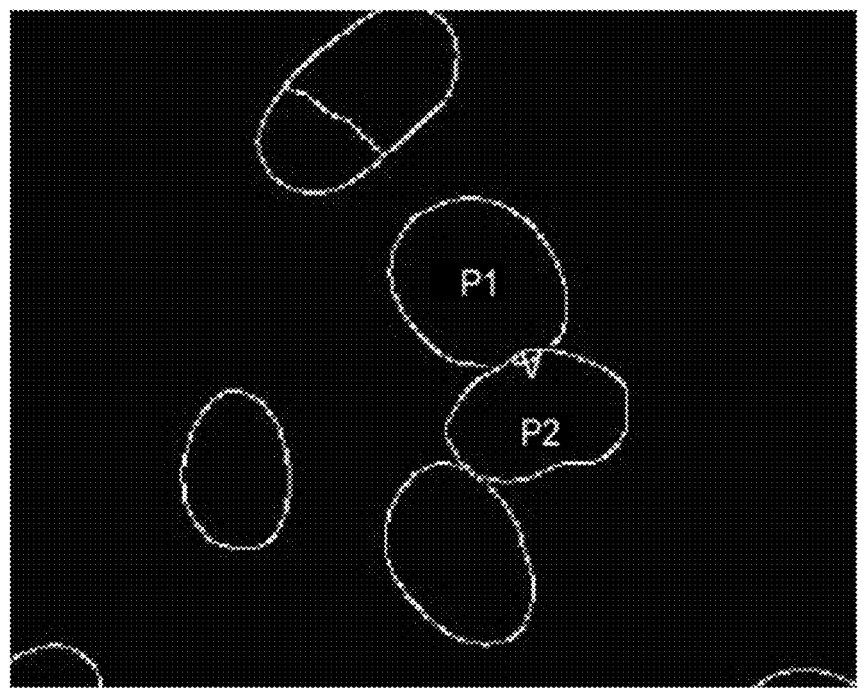
FIG. 6 is a graphical illustration of curve information on intersecting boundary in inter regions in accordance with the invention.
Figure 7:
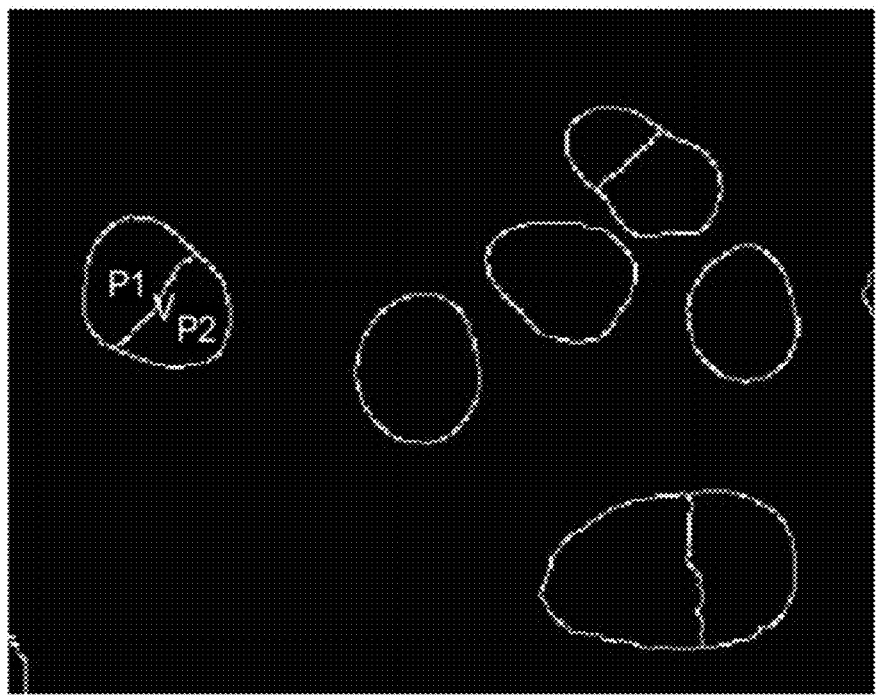
FIG. 7 is a graphical illustration of curve information on the intersecting boundary in intra regions in accordance with the invention.

Next, at block 509 a region merging technique is utilized to decide which region belongs to the same cell of the transformed image and merge them and retain the region boundaries between regions belonging to different cells. Also, this merging technique is based on analyzing the shape information between the neighboring regions. Regions that belong to different cells or inter regions, the boundaries between neighboring regions have some curvature information as shown in FIG. 6. For regions belonging to the same sell or intra region, there is very little curve information between boundaries of neighboring regions as shown in FIG. 6. This observation is exploited to make a decision whether regions belong to the same cell or not.

All neighboring regions in the images are analyzed on a set basis (set comprises of a pair of neighboring regions) and decision to merge or not are based on the following steps:

1. For each pair of neighboring regions, the maximum intensity of both the region is found (say P1 and P2) These are image intensity values (intensity values formed after performing distance transform) They are proportional to the size of the region, larger the region, greater are the values. An example of the P1, P2 and V values are shown below.

| P1 | P2 | V | Merge_Depth | Result |
|---|---|---|---|---|
| 46 | 46 | 44 | 92.265923 | Merged |
| 30 | 29 | 28 | 59.211487 | Merged |
| 26 | 18 | 2 | 3.605551 | Not Merged |
| 24 | 21 | 19 | 40.012497 | Merged |
| 23 | 23 | 22 | 43.416588 | Merged |
| 22 | 22 | 21 | 44.598206 | Merged |

2. Next, the maximum intensity is found along the intersecting boundary of the two regions (say V) Again this intensity value is proportional to region size. Greater the region size, greater is the value
3. The two boundary points are found along the intersecting boundary, then Euclidian distance is calculated between the boundary points, which we will call distance merge_distance. The boundary points are selected by scanning the boundary pixels of one of the regions. The pixels which satisfy the criterion that they have neighboring pixels such that at least one neighboring pixel is a background pixel, at least one neighboring pixel has label same as the current pixel and at least one neighboring pixel has a different label can be considered to lie on the boundary between two regions. If there are more than two pixels, which satisfy the criterion, than a Euclidian distance is found between all possible pairs of pixels. For example, if there are three pixels A, B and C, distance is found between all pairs (A,B), (A,C) and (B,C) and pixels with maximum distance are selected. This ensures that pixels are actually border pixels at two different ends of the border, instead of two pixels lying on the same side of the border. Euclidian distance is calculated between two pixels X with coordinates (x1, y1) and Y with coordinates (x2,y2) as Euclidean Distance=$d=\sqrt{(x_2-x_1)^2+(y_2-y_1)^2}$. In general, the distance between points x and y in a Euclidean space $\mathbb{R}^n$ is given by $$d = |x - y| = \sqrt{\sum_{i=1}^{n} |x_i - y_i|^2}.$$

Taken from the website for Wolfram MathWorld.

4. The regions are merged if, $$(P1-V)^2+(P2-V)^2 <= \text{merge\_distance} \quad \text{(Equation 1)}$$

After merging regions, the region labels are updated to reflect for the next set of neighboring regions. The update means that when the algorithm decides that two neighboring regions with labels 1 and 3 need to be merged, all the pixels of both the regions should have the same label. From an image perspective, it means that two different regions, which were lying side by side, are now merged as a single region. However, this update is internal for the algorithm and is not shown to the user. The user is shown the updated image after processing for all regions has been done. This updated image would contain all intra regions (belonging to the same cell) be merged and all inter regions (belonging to different cells) have their boundaries retained.

Thus, for intra regions (FIG. 6) the value of V is quite similar the value of P1 and P2. These values are the intensity values of the distance transform image, decided by the distance of the pixel from the nearest boundary. As there is very little curvature information, all three values P1, P2 and V are at a more or less similar distance from the boundary. Thus, they have similar values. This causes the left hand side of the equation 1 to become very less and equation 1 is satisfied and regions are merged.

Similarly for inter regions (FIG. 3), the value of V is quite small as compared to values of P1 and P2. This is because V is closer to the boundary than either one of the peaks. Thus, in equation 1 the value of the left hand side becomes much greater than value of the right hand side and regions are not merged. Apart form the decision making logic described above, another heuristic method to decide to split or merge is applied before the actual logic to speed up algorithm. For each pair of neighboring regions, the area of both the regions is found out. If the area of either of the regions is less than 1% (area of largest region), the regions are directly merged. This is based on the observation that all cells in an image generally have similar sizes. If a region has an extremely small size, it can directly be categorized as an intra region and merged. The value of 1% has been decided empirically.

Next, at block 509 the demarcating boundaries between the different regions are drawn for image display. The demarcating process is carried out by scanning the entire image for pixels that have at least one neighboring pixel with a different label and the different label is not a background label. These pixels lie on the boundary and form the demarcation between two regions. Thus, there is merging of the boundaries between the different regions or the very small regions to save processing and decrease time required by the algorithm. Therefore, the image of the confluent cells/nuclei is processed such that to preserve the boundaries between different cells/nuclei. The image of the confluent cells is processed to appear to be merged into at least one cell or different cells. Then the process ends.

This invention provides a system and method that enables a user to merge confluent cells/nuclei. The user is able to unclump cells that induce errors in measurements conducted on cells such as cells, such as area, count of cells etc. A person utilizing this invention is able to transform confluent cells/nuclei by applying a distance transform, apply a region growing technique to the distance transform then apply a merging technique in order to merge over segmented cells/nuclei in an image. Thus, this invention provides the user with a means to easily optimize the image of the cells by transforming confluent cells/nuclei into different cells so that errors are not induced in measurements conducted on cells, like area, count of cells etc.

Although the present invention has been described above in terms of specific embodiments, many modification and variations of this invention can be made as will be obvious to those skilled in the art, without departing from its spirit and scope as set forth in the following claims.

What is claimed is:

1. A method for distinguishing biological materials, the method comprising:
    providing at least one segmented image of at least two confluent cells;
    applying a distance transform to the at least one segmented image of the confluent cells;
    applying a region growing technique to the distance transform of the at least one segmented image of the confluent cells to form a region grown image, wherein a plurality of regions are formed in the at least one segmented image of the confluent cell;
    assigning at least one label to at least one of the plurality of regions of the at least one segmented image of the confluent cells;
    applying a merging technique to at least two of the plurality of regions if it is determined that at least two of the plurality of regions are neighboring regions;
    determining whether to assign a same label to the neighboring regions or retain existing labels; and
    merging the neighboring regions of the region grown image if labels are changed to form at least one image of at least one cell.

2. The method of claim 1, wherein the merging technique is a region merging technique.

3. The method of claim 1, wherein a decision-making logic algorithm is utilized to assign the at least one label to the plurality of regions of the segmented image.

4. The method of claim 1, wherein applying the merging technique further comprises analyzing shape information of each of the neighboring regions.

5. The method of claim 4, further comprising providing a maximum intensity for a pair of the neighboring regions.

6. The method of claim 5, further comprising providing a maximum intensity along an intersecting boundary of the pair of the neighboring regions.

7. The method of claim 6, providing a plurality of boundary points along the intersecting boundary of the pair of the neighboring regions.

8. The method of claim 7, further comprising calculating a Euclidean distance between the plurality of boundary points to form a merge_distance.

9. The method of claim 8, further comprising updating the region labels to reflect for a next set of the neighboring regions.

10. An apparatus for distinguishing cells, comprising:
    an image receiving device configured to:
        provide at least one segmented image of at least two confluent cells;
        apply a distance transform to the at least one segmented image of the confluent cells;
        apply a region growing technique to the distance transform of the at least one segmented image to form a region grown image, wherein a plurality of regions are formed in the at least one segmented image;
        assign at least one label to at least one of the plurality of regions of the at least one segmented image;
        apply a merging technique to at least two of the plurality of regions of the segmented image of the confluent cells if it is determined that at least two of the plurality of regions of the at least one segmented image of the confluent cells are neighboring regions of the at least one segmented image of the confluent cells;
        determine whether to assign a same label to the neighboring regions of the at least one segmented image of the confluent cells or retain existing labels; and
        merge the neighboring regions if labels are changed of the region grown image into one image of at least one cell.

11. A system for distinguishing biological materials, comprising:
    an imaging system configured to receive an image of at least one cell in a previous frame, wherein the imaging system is connected to an image receiving device;
    an image receiving device configured to:
        provide at least one segmented image of at least two confluent cells;
        apply a distance transform to the at least one segmented image of the confluent cells;
        apply a region growing technique to the distance transform of the at least one segmented image of the confluent cells into a region grown image, wherein a plurality of regions are formed in the at least one segmented image of the confluent cells;
        assign at least one label to at least one of the plurality of regions of the at least one segmented image of the confluent cell;
        apply a merging technique to at least two of the plurality of regions of the segmented image of the confluent cell if it is determined that at least two of the plurality of regions of the at least one segmented image of the confluent cell are neighboring regions of the at least one segmented image of the confluent cells;
        determine whether to assign a same label to the neighboring regions of the at least one segmented image of the confluent cells or retain existing labels; and
        merge the neighboring regions if labels are changed of the region grown image of the confluent cells into one image of at least one cell.

12. A computer-implemented image processing method for distinguishing biological materials, the method comprising:
    providing at least one segmented image of at least two confluent cells;
    applying a distance transform to the at least one segmented image of the confluent cell;
    applying a region growing technique to the distance transform of the at least one segmented image of the confluent cells to form a region grown image, wherein a plurality of regions are formed in the at least one segmented image of the confluent cell;
    assigning at least one label to at least one of the plurality of regions of the at least one segmented image of the confluent cells;
    applying a merging technique to at least two of the plurality of regions of the segmented image of the confluent cell if it is determined that at least two of the plurality of regions of the at least one segmented image of the confluent cells are neighboring regions of the at least one segmented image of the confluent cells;

determining whether to assign a same label to the neighboring regions of the at least one segmented image of the confluent cell or retain existing labels; and merging the neighboring regions if labels are changed of the region grown image into one image of at least one cell.

* * * * *